Oct. 3, 1967 G. F. KENWORTHY 3,344,894
ADJUSTABLE HYDRAULIC SHOCK ABSORBER
Filed Oct. 14, 1965 2 Sheets-Sheet 1

INVENTOR
GRANT F. KENWORTHY

United States Patent Office 3,344,894
Patented Oct. 3, 1967

3,344,894
ADJUSTABLE HYDRAULIC SHOCK ABSORBER
Grant F. Kenworthy, Des Plaines, Ill., assignor to Rex Chainbelt Inc., Milwaukee, Wis., a corporation of Wisconsin
Filed Oct. 14, 1965, Ser. No. 496,051
4 Claims. (Cl. 188—96)

ABSTRACT OF THE DISCLOSURE

An adjustable hydraulic shock absorber having alignable port and groove means in relatively rotatable cylindrical members to provide the necessary degree of adjustment.

---

This invention relates to improvements in adjustable hydraulic shock absorbers of the type that may be field adjusted to provide uniform deceleration and stopping of any load provided only that its weight, velocity and propelling force produce a total kinetic energy which is within the capacity of the shock absorber.

In applications of shock absorbers there are instances when it is desired to stop a relatively light load moving at a fairly high velocity to provide a constant resisting force with smooth gradual deceleration, and there are other times when it is necessary to stop a very heavy load moving quite slowly. By providing an adjustable shock absorber, the same shock absorber unit can be utilized in an application where conditions will be varying or require adjustment to suit the peculiar conditions of each application.

It is known in the art to provide a series of ports in the cylinder wall of the shock absorber so that progressively fewer ports are positioned for the escape of the fluid from the cylinder as the piston moves therein and over the ports. Since kinetic energy is the product of force and distance and the area and stroke of the piston are fixed, the limiting and significant parameter is the pressure of the fluid produced by movement of the piston by and with the load. It is also known to size and space such ports accordingly so that the pressure in the cylinder is maintained substantially constant throughout the stroke of the piston whereby a given load having an initial velocity is uniformly decelerated during the entire stroke of the piston and the same load at a lesser velocity is decelerated throughout a lesser portion of the stroke. Adjustment of such hydraulic shock absorbers for a larger or a smaller load has been attempted by making the ports respectively smaller or larger. However, a problem arises in throttling down the flow through the ports for very large loads as these large loads require disproportionately smaller ports because of the higher velocities to be controlled. With these smaller ports of a conventional type, such as known in the prior art, when the load is very great the adjustment is critical and very difficult. Accordingly, this invention provides a unique port construction providing equally precise adjustment for light and heavy loads. The construction of the port opening includes tapered grooves in one metering tube providing a finely adjustable and high strength variable porting arrangement when the grooves are removed relative to a port in the other metering tube. Further, these grooves of tapered depth may be simultaneously cut on one side of the cylinder at a time by a row of fixed tools outside of an eccentrically turning metering tube. The holes in the metering tube are positioned at the deepest part of the tapered groove and one-half the length of the groove is used.

Other objects of the invention will be pointed out in the following description and claims and illustrated in the accompanying drawings, which disclose by way of example, the principle of the invention and the best mode which has been contemplated of applying that principle.

Figure 1:
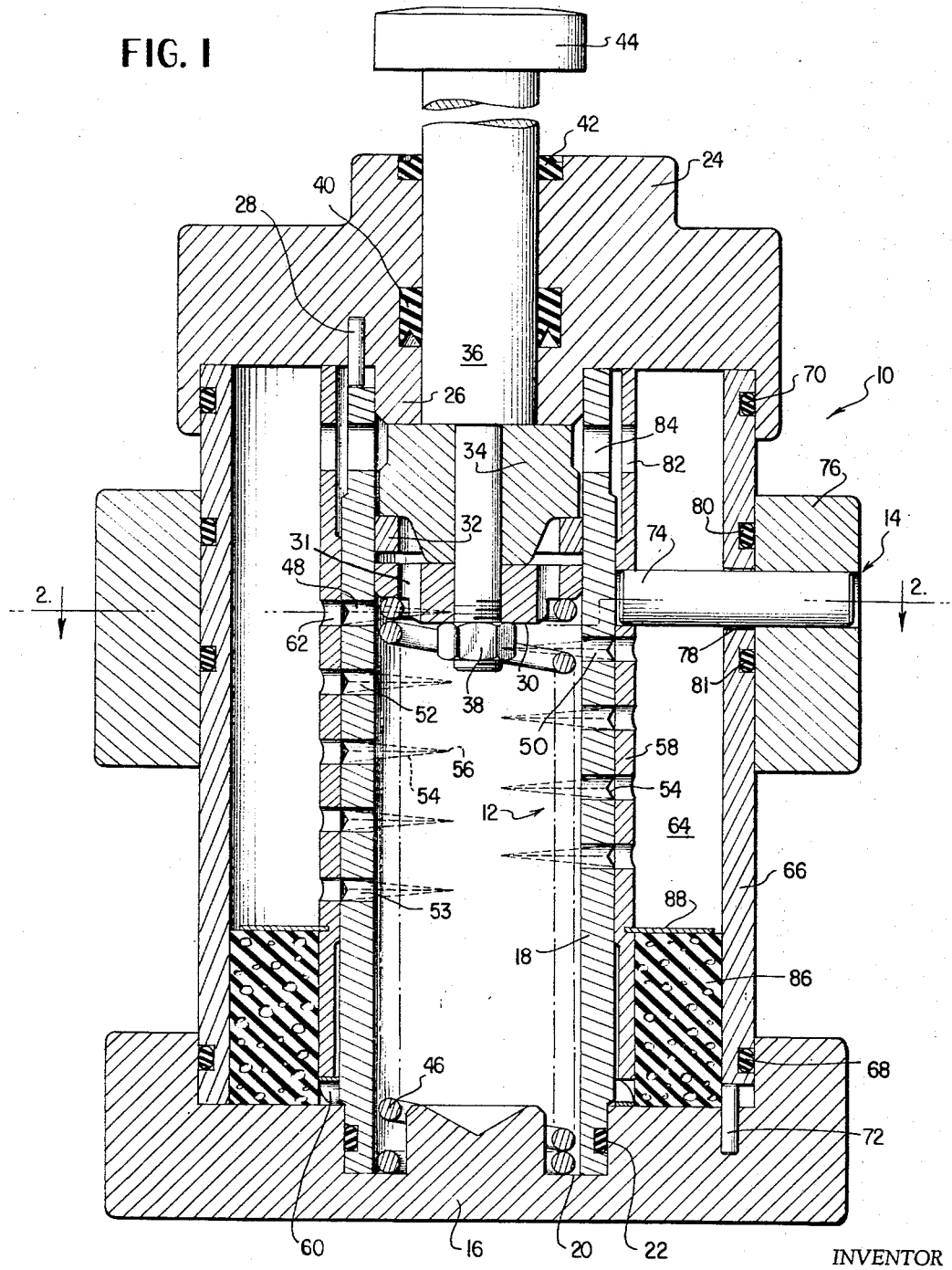
FIGURE 1 is a sectional elevation view taken through the center of the adjustable hydraulic shock absorber of this invention.

Referring to the drawings, adjustable hydraulic shock absorber 10 includes a shock absorber assembly 12 and an adjustment assembly 14 integrally related. Both the adjustable shock absorber assembly and the adjustment assembly are supported on a one-piece back head 16 and the shock absorber assembly includes a cylindrical wall or inner metering tube 18 which may be precision honed seamless tubing and this tube is mounted in an annular well 20 in back head 16 and sealed by an O-ring seal 22. The top of the shock absorber assembly shown in FIGURE 1 includes a front head 24 which is secured to the back head 16 by tie bolts (not shown). The front head 24 includes a boss 26 around which the top of inner metering tube 18 is secured. A pin 28 prevents rotation of tube 18.

The shock absorber includes a piston 30 for operating within the cylinder formed by tube 18. The piston has a passage 31 through the head thereof and carries a movable piston ring check valve 32 between the piston 30 and a follower 34. The piston and follower are mounted on a small diameter portion of piston rod 36 and secured thereon by threaded nut 38. The piston rod 36 extends through the front head 24 and the head is provided with suitable rod packing 40 surrounding the rod as well as a rod scraper 42 at the outer surface of the front head 24. The outer end of the rod 36 is provided with a bumper 44. Within the inner cylinder wall 18 and below piston 30 there is provided a return spring 46 for returning the piston rod 36 and piston 30 to the position shown in FIGURE 1 when there is no load placed on the shock absorber.

The inner metering tube 18 includes a plurality of ports 48, 50, 52, etc. For better spacing, the ports are staggered in opposite sides of the metering tube and are spaced longitudinally of the axis of the metering tube 18 in order to provide a uniform deceleration over the full stroke of the shock absorber and the softest stop thereof. In other words, the positioning of the ports 48, 50, 52, etc., control the outflow of the hydraulic fluid when a force is applied to bumper 44 and by suitable positioning of these holes the shock absorber gradually decelerates and gently stops any moving load because as each port 48, 50, 52 was covered up the remaining outlet area is correspondingly less for the incompressible hydraulic fluid to escape from.

In order to further adjustably control the amount of kinetic energy absorbed by the shock absorber while still providing for gradually decelerating and gently stopping the moving load, there is provided a unique arrangement for controlling the outflow from all of the ports 48, 50, 52, etc., simultaneously. This unique arrangement includes grooves 54 in the outer surface of metering tube 18, there being one groove communicating with each orifice. Since all grooves are identical, the operation of only one groove shown in section in FIGURE 2 will be described. Groove 54 tapers from the two terminal ends of the groove, which are spaced about 180° apart, toward the deepest point of the groove which is located at the midpoint thereof and at which point the orifice 48 is located.

Surrounding the inner metering tube 18 and closely fitting thereon for rotation thereabout is an outer cylinder wall or outer metering tube 58 which is supported on a wavy spring 60 positioned on back plate 16. The outer metering tube has a plurality of outlet ports 62 at the level of each groove 54 and corresponding in one position of the outer tube 58 to the orifices 48, etc., in the inner tube 18, see FIGURE 1. However, the outer tube may be rotated by the adjustment assembly 14 to position the orifice at an angular position remote from its corresponding orifice. See FIGURE 2 where the outer tube 58 has been rotated 45° from its position shown in FIGURE 1 with orifices 48 and 62 aligned.

Surrounding the outer metering tube 58 there is a hydraulic reservoir 64 defined by the outer surface of metering tube 58, the back and front heads 16 and 24 and reservoir tube 66. Reservoir tube 66 is suitably sealed to the front and back heads by O-ring seals 68 and 70 and is kept from rotating by pin 72.

Any of various means for the rotational adjustment of tube 58 may be provided. The adjustment means shown includes an adjustment pin 74 having one end fixed in outer metering tube 58 and the other end fixed in adjustment band 76. The pin is moved by rotating the band 76 and its movement is allowed by slot 78 in the reservoir tube 66. Because of slot 78, the band 76 needs to be sealed to the reservoir tube by suitable seals such as O-ring seals 80 and 81.

To provide a return passage for the hydraulic fluid, there are large openings 82 and 84 in the outer metering tube 58 and inner metering tube 18 respectively at a position near the top of these tubes, see FIGURE 1.

A closed cell cellular rubber accumulator 86 is provided near the bottom of the hydraulic reservoir 84. This internal accumulator accommodates rod displacement, prevents oil foaming, provides for thermal expansion of the oil, and prevents under and over filling of the unit with oil. It is retained in the lower half of reservoir 64 by a clover leaf-shaped retainer 88. The cellular rubber accumulator and its functions are more fully explained in Patent 3,070,363, granted Dec. 25, 1962, to J. T. Ellis, Jr.

Figure 3:
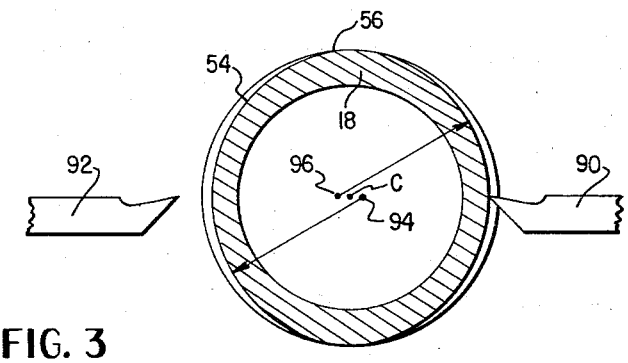
FIGURE 3 is a sectional view of the inner metering tube illustrating the arrangement for cutting the metering grooves in the periphery thereof.

The problem of cutting the tapering grooves 54 is uniquely solved by the arrangement shown in FIGURE 3. In FIGURE 3 the metering tube 18 is shown positioned between two rows of stationary cutting tools 90 and 92, one row of tools being on one side of the tube and the other row on the other side of the tube. There are as many cutting tools 90 as there are grooves 54 desired to be placed in the outside of metering tube 18 and the tools 90 are correspondingly spaced, depending upon the spacing of the grooves to be cut. The tube 18 is first positioned adjacent tool 90 and rotated eccentrically in one direction about point 96 so as to cut the groove as shown in FIGURE 3, and simultaneously cut all other grooves on that side of metering tube 18. Thereafter, the tube 18 may be moved over to a position adjacent the stationary row of tools, including tool 92 and rotated in the opposite direction about eccentric point 94 to cut the other grooves on the other side of the metering tube 18. Thereafter the metering holes or orifices in metering tube 18 are drilled at the deepest point of the respective grooves.

The grooves 54 shown in the drawings are most readily formed so as to have a triangular section with the base of the triangle being the adjoining wall of tube 58. At orifice 48, the base of the triangle should be as wide as the orifice and the depth of the groove or height of the triangle is, of course, limited by the thickness of the material of tube 18. Generally, however, the thickness of such material is more than adequate.

The cross section of the groove at any selected position of ports 62 is the effective cross section the area of which determines the velocity at which the fluid in tube 18 will be discharged through the respective ports of tubes 18 and 58. Preferably, the depth of the grooves should be selected to provide the required effective cross section over the particular range of adjustment generally required.

Figure 2:
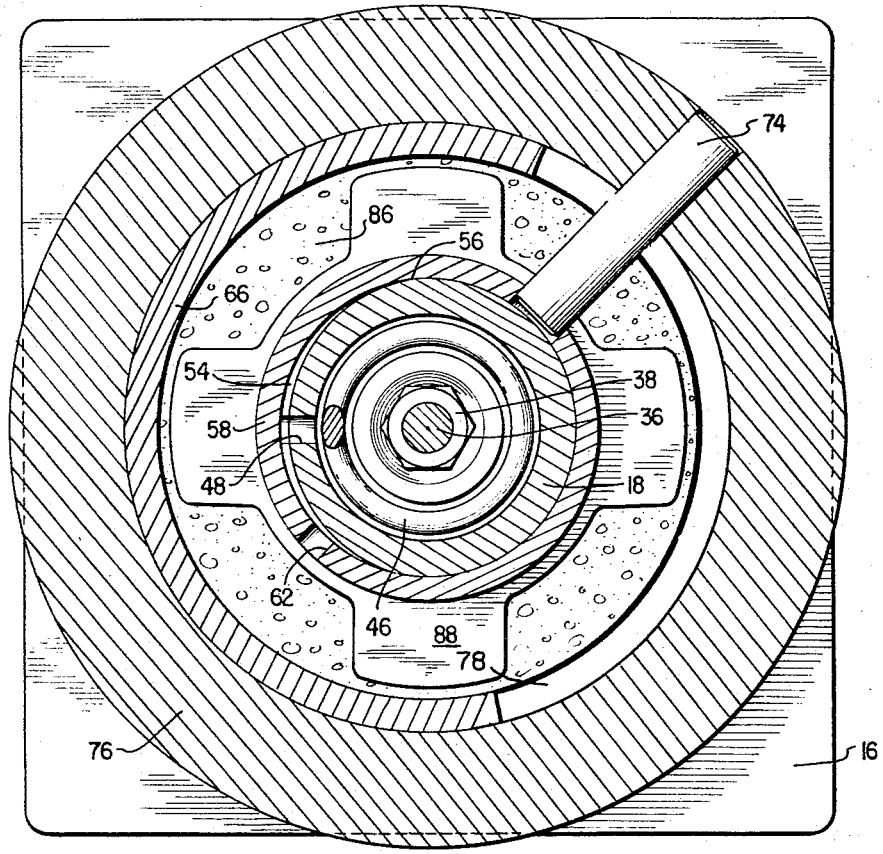
FIGURE 2 is a sectional view taken along line 2—2 of FIGURE 1.

The operation of the adjustable hydraulic shock absorber is believed to be evident from the foregoing description but a brief resume will be given. Initially, the shock absorber will be in the position shown in FIGURE 1 with the cylinder 18 and the reservoir 64 filled with hydraulic fluid and the spring 46 returning the piston 30 and bumper to the position shown. Upon the application of a load to bumper 44 the rod 36 and piston 30 start moving downwardly and the piston forces the hydraulic fluid of oil from the inner metering tube 18 through metering orifices 48, 50, 52, etc., and on out through orifices 62 in the outer metering tube 58 into reservoir 64, while compressing the closed cellular rubber accumulator 86. The resistance to oil flow through orifices 48 and 62 and the other corresponding orifices governs the shock absorber's internal pressure which in turn sets up resisting forces to stop the load. The controlled deceleration and gentle stopping is accomplished because the kinetic energy of the moving rod and piston decays throughout the length of the stroke and approaches zero at the end of the stroke due to the longitudinal spacing of the metering orifices. In order to control the amount of hydraulic resistance the band 76 is rotated around the cylinder causing adjustment pin 74 to rotate outer metering tube 58, for example as shown in FIGURE 2. At that time the passage of the oil from the inner cylinder 18 to the reservoir 64 will be through an orifice area less than the area defined by the diameter of orifices 48 and 62. The amount of orifice area will be determined by the position of the outer metering tube 58 which determines which cross section of the tapered groove 54 is used to restrict the hydraulic fluid flow from the inner cylinder 18 to the reservoir 64. On the downstroke of the piston the accumulator 86 is compressed by the incompressible hydraulic fluid. On the return stroke upon removal of the load, spring 46 returns the piston and piston ring check valve 32 allows hydraulic fluid passing through passages 82 and 84 from the reservoir to again fill up the cylinder 18 and the cellular rubber accumulator correspondingly expands back to its original shape. If desired, the outer surface of reservoir tube 66 may have a scale thereon for cooperating with a pointer provided on adjustable band 76 in order to set the adjustment of the shock absorber at a known load weight.

It can thus be seen that the adjustable hydraulic shock absorber of this invention provides controlled load deceleration and stopping action which may be adjustable over a wide range of loads by a unique arrangement for varying the orifice area of a number of orifices so that the resistance of oil flow caused by the restriction in orifice areas governs the hydraulic shock absorber's internal pressures which in turn set up resisting pressures to stop the moving load. The kinetic energy of the moving load decays throughout the entire stroke and approaches zero at the end of the stroke.

Because grooves 54 are of diminishing width and depth, their cross section is of generally triangular configuration. Thus movement of tube 58 from the one-third to the two-thirds position, referring to the entire range of adjustment as determined by the length of grooves 54, for example, reduces the effective cross section of the groove from four-ninths to one-ninth of the cross section of the groove at ports 52.

The invention thus provides a range of adjustment which is very suitable for calibration in terms of the weight of the load in that the weights in the higher range are well separated so that calibration and setting is readily accomplished.

While the invention has been particularly shown and described with reference to a preferred embodiment thereof, it will be understood by those skilled in the art that various changes in form and details may be made therein without departing from the spirit and scope of the invention.

What is claimed is:
1. An adjustable hydraulic shock absorber comprising;
    (a) a hydraulic shock absorber cylinder including a piston operably mounted therein
    (b) an outer tubular cylinder rotatably positioned over the shock absorber cylinder so that at least a portion of the inner surface of the outer cylinder is contiguous to the outer surface of the shock absorber cylinder
    (c) a plurality of spaced parallel annular grooves of gradually increasing width and depth in the circumferential direction extending at least partially around the circumference of one of the cylinders where said cylinders are contiguous to each other
    (d) a plurality of first ports extending through the walls of the shock absorber cylinder at the position of the deepest part of said grooves
    (e) a plurality of second ports extending through the outer tubular cylinder at the level of the grooves, and
    (f) means for rotating one of the cylinders relative to the other to adjust the location of said second ports along the length of said grooves.

2. An adjustable hydraulic shock absorber as defined in claim 1 further comprising
    (g) a reservoir cylinder surrounding and spaced from the outer tubular cylinder creating a reservoir therebetween, and
    (h) a cellular resilient accumulator in the reservoir.

3. An adjustable hydraulic shock absorber as defined in claim 1 wherein said grooves extend symmetrically in opposite directions from said first ports.

4. An adjustable hydraulic shock absorber as defined in claim 3 wherein a plurality of said grooves and said first and second ports are arranged on opposite sides of said cylinders but staggered in the axial direction of said cylinders.

References Cited

UNITED STATES PATENTS

| | | | |
|---|---|---|---|
| 1,127,822 | 2/1915 | Sturtevant | 251—209 X |
| 1,373,315 | 3/1921 | Dunn. | |
| 1,837,815 | 12/1931 | Hadley | 188—97 |
| 3,070,363 | 12/1962 | Ellis | 188—100 |
| 3,168,168 | 2/1965 | Chorkey | 188—96 |

MILTON BUCHLER, *Primary Examiner.*

G. E. A. HALVOSA, *Assistant Examiner.*